3,070,606
β-AMINOALKYLTHIANAPHTHENE AND β-AMINO-
ALKYLBENZOFURAN DERIVATIVES
Elvin L. Anderson, Moorestown, N.J., assignor to Smith
Kline & French Laboratories, Philadelphia, Pa., a corporation of Pennsylvania
No Drawing. Filed May 1, 1959, Ser. No. 810,216
9 Claims. (Cl. 260—330.5)

This invention relates to new β-aminoalkylthianaphthene and β-aminoalkylbenzofuran derivatives which have useful pharmacodynamic activity with a low order of harmful side effects.

More specifically, the compounds of this invention alter, stimulate or modify central nervous system reactions and are particularly useful in the animal organism as ataractics, psychic energizers and analgetics. The compounds also are useful as anorectics, anticonvulsants, diuretics and hypotensives. Their anorectic activity is especially pronounced. Certain compounds are unique in combining outstanding anorectic and ataractic activity with a low order of side effects.

The novel β-aminoalkylthianaphthene and β-aminoalkylbenzofuran derivatives of this invention are represented by the following structural formula:

FORMULA I

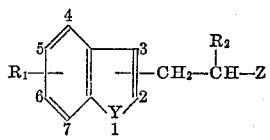

when:
Y represents S, O or $SO_2$;
$R_1$ represents hydrogen, hydroxy, halogen having an atomic weight of less than 80, nitro, trifluoromethyl, lower alkyl or lower alkoxy in positions 5 or 6;
$R_2$ represents lower alkyl; and
Z represents amino, mono-lower-alkylamino, di-lower-alkylamino, cyclopentylamino, cyclohexylamino, N-piperidino or N-pyrrolidino.

By the terms "lower alkyl" and "lower alkoxy" where used herein alone or in combination with other terms, groups having from 1 to 4, preferably 1 to 2, carbon atoms are indicated. The term "β-aminoalkyl" when used in reference to the generic name represented in Formula I includes primary, secondary, tertiary and heterocyclic amino groups attached to an alkyl side chain at the β-position as outlined here above.

Advantageous compounds of this invention are represented by the following structural formula:

FORMULA II

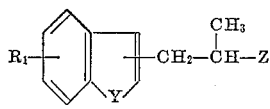

when:
Y represents S, O or $SO_2$;
$R_1$ represents hydrogen, hydroxy, chloro, nitro, trifluoromethyl, methyl or methoxy in positions 5 or 6;
Z represents amino, monomethylamino, dimethylamino or N-piperidino.

Preferred compounds of this invention are represented by the following structural formula:

FORMULA III

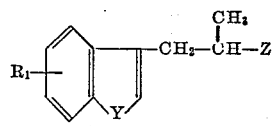

when:
Y represents S or O;
$R_1$ represents hydrogen, hydroxy, chloro or trifluoromethyl in positions 5 or 6;
Z represents amino, monomethylamino, dimethylamino, or N-piperidino.

A particularly advantageous and useful compound as an ataractic or conditioned response blocking agent is 3-(2'-aminopropyl)thianaphthene. A somewhat less active but still very useful compound is 2-(2'-aminopropyl)-benzofuran.

An example of the unexpected utility of the compounds of this invention is their high order of conditioned response blocking activity, [see Cook and Weidley, Annals of the N.Y. Acadamy of Science 66:740 (1957)] which is an indication that the compounds have ataractic activity. This activity of the compounds of this invention is considerably more pronounced than that of the closest compounds of the prior art. For instance, the prior art compound most closely related structurally to a representative member of the compounds of this invention, namely 3-(2'-aminopropyl)thianaphthene, is 3-(2'-aminoethyl)thianaphthene [Kotake, H. and Sakan, T., J. Inst. Polytech, 2, No. 1, 25–8 (1951); Chem. Abstracts 46:6121c (1952)]. The compound of this invention, 3-(2'-aminopropyl)thianaphthene, has been unexpectedly found to have a significant level of activity in the conditioned response blocking test. The $ED_{50}$ of this compound, that is the dose effective in 50% of the animals tested, is 15 mg./kg. while the 3-(2'-aminoethyl)thianaphthene of the prior art is inactive at 100 mg./kg. and only begins to show slight activity at 300 mg./kg. This data indicates that the compound of this invention is at least about twenty times as active as the closest prior art compound. This is indeed surprising and totally unexpected.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophyllineacetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

Compounds of this invention are prepared according to the following synthetic procedure:

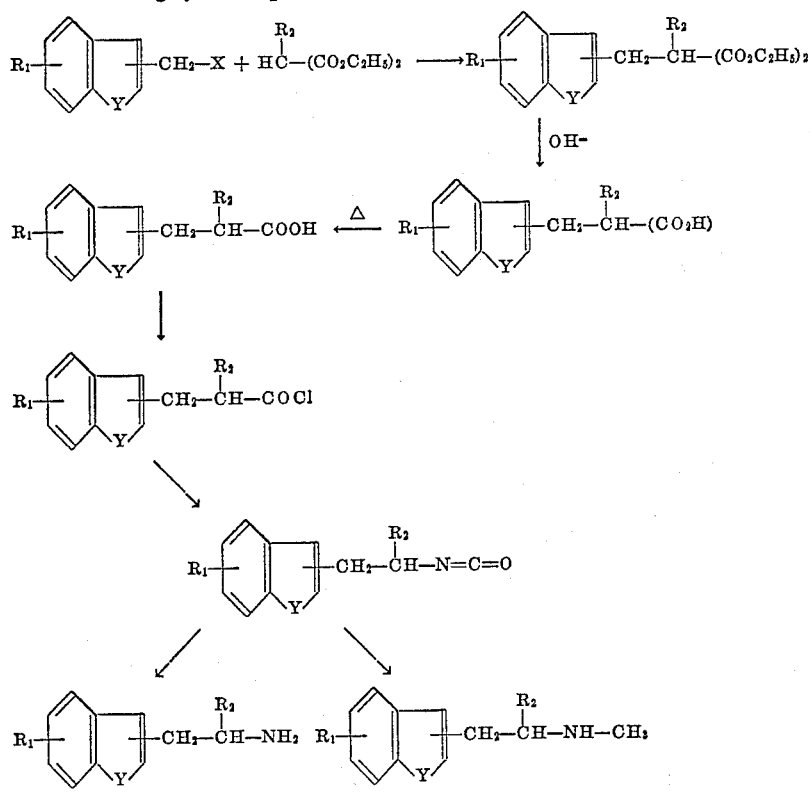

X is halogen and the terms Y, $R_1$ and $R_2$ are as previously defined.

The 3-halomethylthianaphthene starting materials are conveniently prepared from substituted thiophenols, for example, as follows:

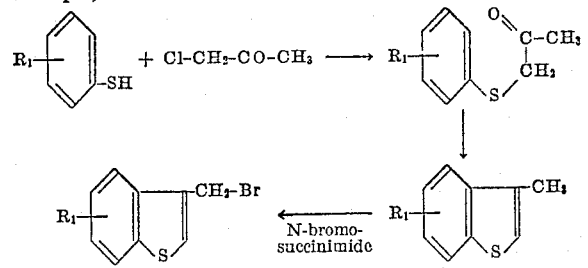

The substituted thiophenol is dissolved in an aqueous solution containing an equivalent amount of an alkali metal hydroxide, such as sodium or potassium hydroxide, and treated with an equivalent amount of chloroacetone at about 20-25° C. for 20 to 60 minutes. The reaction mixture is diluted with a water-immiscible solvent such as ether. The organic layer is separated, solvent evaporated and the residue distilled in vacuo to obtain the 1-phenylmercapto-2-propanone. This propanone is cyclized by heating at 160-180° C. for 30-45 minutes with a dehydrating agent, such as zinc chloride or, preferably, phosphorus pentoxide, to obtain the 3-methylthianaphthene which is then treated with a halogenating agent such as, preferably, N-bromosuccinimide to give the 3-bromomethylthianaphthene.

The 2-halomethylthianaphthene starting materials are prepared as follows:

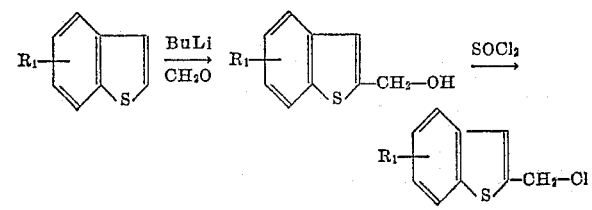

An ether solution of the thianaphthene is added to an ether solution containing lithium and butyl bromide, butyl lithium being present in about a four-fold excess, and the mixture refluxed for one to two hours. Approximately a four-fold excess of gaseous formaldehyde is bubbled into the solution over a period of three to five hours. Water and a lower alcohol, such as ethanol, are added; the mixture is made acidic with hydrochloric acid; the ether layer is separated and evaporated to obtain the 2-hydroxymethylthianaphthene as the residue, which is purified by recrystallization from a suitable solvent, such as n-heptane. Reaction of the hydroxymethyl compound with a chlorinating agent, such as phosphorus trichloride, phosphorus pentachloride or, preferably, thionyl chloride, yields the starting material, 2-chloromethylthianaphthene.

The 3-halomethylbenzofuran starting materials are conveniently prepared by bromination of 3-methylbenzofuran with at least two molar equivalents of N-bromosuccinimide in the presence of a catalytic amount of benzoyl peroxide to give the 2-bromo-3-bromomethylbenzofuran which is then treated as outlined previously, except that at some point during the reaction sequence, preferably after the decarboxylation, the 2-bromo-3-propionic acid is hydrogenated in the presence of a catalyst such as Raney nickel to remove the bromine.

The 2-halomethylbenzofuran starting materials are prepared from coumarilic acid by reduction with a bimetallic hydride such as lithium aluminum hydride and chlorination of the resulting 2-hydroxymethylbenzofuran with a chlorinating agent such as phosphorus pentachloride, phosphorus trichloride or, preferably, thionyl chloride.

The β-primary aminoalkyl-thianaphthene and -benzofuran compounds of this invention are prepared by condensation of an equivalent amount of a diethyl α-alkyl malonate with a halomethylthianaphthene in the presence of an alkali metal alkoxide, for example, sodium or potassium methoxide or sodium or potassium ethoxide, to obtain the corresponding diethyl α-alkyl-α-thianaphthenyl (or benzofuranyl)methyl malonate. This ester is hydrolyzed with an alkali metal hydroxide, such as potassium or sodium hydroxide, to obtain the corresponding malonic acid, then decarboxylated by heating at 170-200°

C. for two to three hours to give the propionic acid. Treatment with an excess of a chlorinating agent such as phosphorus trichloride, phosphorus pentachloride or, preferably, thionyl chloride yields the corresponding propionyl chloride.

The propionyl chloride in an inert organic solvent such as xylene or toluene is refluxed with an excess of sodium azide to obtain, upon concentration of the mixture, the corresponding isocyanate.

Heating the isocyanate with concentrated hydrochloric acid for 10–20 hours, then cooling yields crystalline β-aminoalkyl-thianaphthene or -benzofuran hydrochloride. The free base is obtained by dissolving the hydrochloride salt in water, neutralizing with an alkali metal hydroxide, such as sodium hydroxide and extracting with a water-immiscible organic solvent such as ether. Evaporation of the solvent gives the β-primary aminoalkyl-thianaphthene or -benzofuran compounds of this invention.

Alternatively, the isocyanate compound is refluxed in ether solution with an excess of lithium aluminum hydride for six to ten hours. The mixture is decomposed by the addition of water and alkali metal hydroxide solution such as sodium hydroxide solution. Filtration, separation of the ether layer, extraction with dilute mineral acid, such as hydrochloric acid, neutralization with alkali metal hydroxide such as sodium or potassium hydroxide, extraction with ether and evaporation of the solvent yields the β-metylaminoalkyl-thianaphthenes or -benzofurans of this invention.

Alkylation of the β-primary aminoalkyl-thianaphthenes and -benzofurans to prepare further compounds of this invention is accomplished in several ways. To obtain piperidyl or pyrrolidyl compounds, the β-primary aminoalkyl compound is heated with either a molar equivalent or with an excess of polymethylene dihalide and an organic base such as pyridine for about 12 to 18 hours. Dilution with water and a water-immiscible organic solvent such as ether, separation of the organic layer and evaporation of the solvent leaves a residue which is taken up in an inert organic solvent, such as benzene or toluene and evaporated to yield piperidyl or pyrrolidyl compounds of this invention.

Monoalkylation is accomplished by refluxing the β-primary aminoalkyl-thianaphthene or -benzofuran with at least one equivalent of the appropriate acid chloride or acid anhydride and subsequent reduction of the resulting amide with an alkali metal hydride such as lithium aluminum hydride. Dialkylation is accomplished by the same procedure when the starting material is a β-secondary aminoalkyl compound.

Methylation is conveniently carried out by reaction of the β-primary aminoalkyl compound with ethyl chloroformate to form a urethane and reduction of the urethane with lithium aluminum hydride to yield the methylamino compounds of this invention.

Cycloalkyl alkylation is accomplished by stirring the β-aminoalkyl compound with the appropriate cyclic ketone for two to four hours in a lower alcohol solution, such as ethanol. Reduction of the Schiff base which is formed can be conveniently carried out with an equivalent amount of an alkali metal hydride, such as sodium borohydride, lithium aluminum hydride, magnesium aluminum hydride, sodium aluminum hydride or lithium borohydride. The alkali metal hydride is added slowly to Schiff base in absolute alcohol solution, for example ethanol solution and the resulting mixture refluxed for 10 to 20 minutes. Addition of two equivalents of an alkali metal hydroxide solution, for example sodium hydroxide, followed by the addition of cold water or the addition of cold water alone results in the precipitation of the cyclo-alkylamino-thianaphthene or -benzofuran product which is isolated by filtration.

The β-primary aminoalkylthianaphthene-1,1-dioxide compounds of this invention are prepared by refluxing β-(N-acetylamino)-alkylthianaphthenes, which are prepared by acetylating a β-primary aminoalkylthianaphthene with acetic anhydride, with an excess of a hydrogen peroxide solution for about 30 to 90 minutes. Diluting the solution with water and filtering yields crystals of the β-(N-acetylamino)-alkylthianaphthene-1,1-dioxide which is hydrolyzed by refluxing in a mineral acid solution such as sulfuric acid. Neutralization with alkali metal hydroxide solution, such as sodium hydroxide, extraction with a water-immiscible organic solvent such as ether, and evaporation of the solvent gives the β-primary aminoalkylthianaphthene - 1,1 - dioxide compounds. The remaining β-aminoalkylthianaphthene-1,1-dioxide compounds represented by Formula I, other than β-primary aminoalkyl, are prepared by refluxing the β-aminoalkylthianaphthene with hydrogen peroxide solution as described above, diluting the reaction mixture with water and filtering the β-aminoalkylthianaphthene-1,1-dioxide.

It will be readily apparent to one skilled in the art that the compounds of this invention may be present as optical isomers. The connotation of the general formulae presented herein is to include all isomers, the separated $d$ or $l$ optical isomers as well as the $dl$ mixture of these isomers.

The following examples are not limiting but are illustrative of compounds of this invention and will serve to make fully apparent all of the compounds embraced by the general formula given above.

*Example 1*

To a solution of 23.7 g. of sodium in 2 liters of absolute ethanol is added 186 g. of diethyl α-methyl-malonate followed by 192 g. of 3-chloromethylthianaphthene. The resulting mixture is heated at reflux for 24 hours. The mixture is cooled and diluted with water and ether. The layers are separated. The ether solution is washed with water, dried over magnesium sulfate and evaporated in vacuo. Distillation of the residue yields diethyl α-methyl-α-(3-thianaphthenylmethyl)malonate, B.P. 172–178° C. at 0.2 mm.

A mixture of 257 g. of potassium hydroxide and 245 g. of diethyl α-methyl-α-(3-thianaphthenylmethyl)-malonate in 520 ml. of water and 1600 ml. of aqueous ethanol is refluxed for 24 hours. The alcohol is removed in vacuo and the residue dissolved in water. The aqueous solution is washed with ether, made acidic with concentrated hydrochloric acid and filtered. The white solid material is washed with water and dried to give α-methyl-α-(3-thianaphthenylmethyl)malonic acid, M.P. 159–161° C.

α - Methyl - α - (3-thianaphthenylmethyl)malonic acid (177 g.) is heated at 170° C. for two hours. The evolution of gas from the melt stops after about one hour of heating. The temperature is raised to 200° C., then the melt is allowed to cool giving α-methyl-β-(3-thianaphthenyl)propionic acid as a brown glass. This acid is treated with 340 ml. of thionyl chloride and allowed to stand at room temperature for 36 hours. The excess thionyl chloride is removed in vacuo. The residue is distilled to give α-methyl-β-(3-thianaphthenyl)propionyl chloride, B.P. 133–138° C. at 0.5 mm.

A solution of 21.0 g. of α-methyl-β-(3-thianaphthenyl) propionyl chloride in 80 ml. of dry toluene is added slowly with stirring and warming to 24.0 g. of sodium azide in 80 ml. of dry toluene. The resulting mixture is refluxed for three hours, then filtered. The solvent is evaporated in vacuo to yield the crude residue, α-methyl-β-(3-thianaphthenyl)ethanol isocyanate, a pale yellow oil.

This isocyanate (19.0 g.) is cooled in ice; concentrated hydrochloric acid is added slowly. The resulting mixture is heated to frothing with stirring for about 16 hours. The solution is cooled in ice giving 3-(2′-aminopropyl) thianaphthene hydrochloride as a white precipitate, which upon recrystallization from ethanol-ether gives the pure hydrochloride.

The hydrochloride is dissolved in water, treated with an excess of sodium hydroxide solution and extracted with ether. Evaporation of the ether in vacuo, leaves 3-(2'-aminopropyl)thianaphthene as the residue.

*Example 2*

A solution of 25.0 g. of α-methyl-β-(3-thianaphthenyl)ethanol isocyanate (prepared as in Example 1) in 500 ml. of dry ether is added slowly to 9.5 g. of lithium aluminum hydride in 500 ml. of dry ether. The mixture is stirred and refluxed for eight hours, then decomposed by the addition of 9.5 ml. of water, 9.5 ml. of 10% sodium hydroxide, followed by 28 ml. of water. The mixture is filtered; the ethereal filtrate is washed with water and then extracted with dilute hydrochloric acid. The acid solution is made basic with 40% aqueous sodium hydroxide and extracted with ether. The ether solution is washed with water, dried over magnesium sulfate and evaporated in vacuo to leave 21.9 g. of crude 3-(2'-N-methylaminopropyl)thianaphthene as an oil.

A solution of 1.0 g. of 3-(2'-N-methylaminopropyl)-thianaphthene in aqueous ethanol is acidified with ethereal hydrogen chloride and diluted with either. The solid which precipitates is collected and recrystallized from aqueous ethanol-ether to give 3-(2'-N-methylaminopropyl)thianaphthene hydrochloride.

*Example 3*

A mixture of 16.0 g. of 3-(2'-aminopropyl)thianaphthene (prepared as in Example 1), 20.2 ml. of dry pyridine and 29.0 g. of 1,5-dibromopentane is warmed on a steam bath for 16 hours, then heated vigorously at 95–100° C. for four hours. The mixture is cooled, diluted with water and ether. The aqueous layer is separated, acidified and washed with ether. The acidic solution is made basic and extracted with water, dried over magnesium sulfate and evaporated in vacuo. The residue is dissolved in toluene which is then removed by evaporation to yield crude 3-[2'-(1''-piperidyl)propyl]thianaphthene.

This crude material is dissolved in aqueous ethanol, filtered, acidified with ethereal hydrogen chloride and diluted with ether. The white precipitate is collected and recrystallized from ethanol-ether to give 3-[2'-(1''-piperidyl)propyl]thianaphthene hydrochloride, M.P. 262–264° C.

*Example 4*

A mixture of 10.0 g. of 3-(2'-aminopropyl)thianaphthene (made as in Example 1) and 50 ml. of acetic anhydride is allowed to stand overnight at room temperature. The excess acetic anhydride is removed in vacuo on the steam bath. The residue is diluted with water and warmed for one hour on the steam bath. The solution is cooled and filtered to give 3-(2'-N-acetylaminopropyl)thianaphthene as a colorless solid.

To a solution of 9.12 g. of 3-(2'-N-acetylaminopropyl)thianaphthene in 200 ml. of glacial acetic acid is added 36 ml. of 30% hydrogen peroxide solution. The resulting mixture is heated at 50° C. for 15 minutes, then refluxed for one hour. The solution is poured into water, allowed to stand overnight and filtered to give white crystals of 3-(2'-N-acetyl aminopropyl)thianaphthene-1,1-dioxide, M.P. 214–216° C.

A mixture of 4.15 g. of 3-(2'-N-acetylaminopropyl)thianaphthene-1,1-dioxide in 300 ml. of 10% sulfuric acid is stirred and refluxed for 20 hours. The resulting solution is cooled and filtered. The filtrate is washed with ether, made basic with 40% aqueous sodium hydroxide and extracted with ether. The ether solution is washed with water, dried over magnesium sulfate and evaporated in vacuo to leave, as a yellow oil, crude 3-(2'-aminopropyl)thianaphthene-1,1-dioxide.

The free base (1.0 g.), dissolved in 100 ml. of acetone, is treated with an excess of maleic acid in acetone solution. Dilution with ether and filtration gives the maleate salt of 3-(2'-aminopropyl)thianaphthene-1,1-dioxide which is recrystallized from ethanol-ether to give the pure salt.

*Example 5*

To a solution of 10.95 g. of 3-(2'-N-methylaminopropyl)thianaphthene (made as in Example 2) and 8.5 g. of pyridine in 120 ml. of dry benzene is added slowly with stirring and cooling, a solution of 6.97 g. of ethyl chloroformate in 50 ml. of dry benzene. The mixture is stirred at room temperature for four hours and allowed to stand overnight. The mixture is diluted with water and the layers separated. The water layer is washed with ether, and the combined benzene-ether solution is washed with water, with dilute hydrochloric acid and water. The organic solution is dried over magnesium sulfate and stripped of solvent in vacuo. The residue, crude 3-(2'-N-methylaminopropyl)thianaphthene urethan is dissolved in ether and added slowly to 3.8 g. of lithium aluminum hydride in 100 ml. of dry ether. The resulting mixture is stirred and refluxed for seven hours, then decomposed with 3.8 ml. of water, 3.8 ml. of 10% sodium hydroxide solution, followed by 10 ml. of water. This mixture is refluxed for one hour, then filtered. The ether filtrate is extracted with 10% hydrochloric acid. The acid solution is washed with ether and made basic with 40% sodium hydroxide. The basic solution is extracted with ether. The ethereal solution is washed with water, dried over magnesium sulfate and stripped of solvent to give crude 3-(2'-N,N-dimethylaminopropyl)thianaphthene as the residue.

The free base (1.0 g.), dissolved in aqueous ethanol, is treated with an excess of ethereal hydrogen chloride and diluted with ether. The precipitate is collected and recrystallized from ethanol-ether to give the hydrochloride of 3-(2'-N,N-dimethylaminopropyl)thianaphthene.

*Example 6* p-Chlorothiophenol (14.5 g.) is dissolved in an aqueous solution containing 4.0 g. of sodium hydroxide. With cooling and stirring, 9.3 g. of chloroacetone is added dropwise over 30 minutes, keeping the temperature at 20–25° C. The reaction mixture is extracted with ether. The ether solution is washed with water and dried over magnesium sulfate. After removal of the solvent, the residue is distilled to yield 1-(4'-chlorophenylmercapto)-2-propanone.

To 70 g. of stirred phosphorus pentoxide is added 66.6 g. of 1-(4'-chlorophenylmercapto)-2-propanone. The mixture is warmed gradually to 180° C. and then an additional 134.1 g. of the propanone is added dropwise. An additional 25 g. of phosphorus pentoxide is added and the mixture heated at 180° C. for 40 minutes. The mixture is cooled and distilled to give 5-chloro-3-methylthianaphthene, B.P. 92–93° C. at 0.3 mm.

A mixture of 18.2 g. of 5-chloro-3-methylthianaphthene, 17.8 g. of N-bromosuccinimide and 300 ml. of carbon tetrachloride is refluxed for two hours. The mixture is filtered to remove succinimide and the filtrate concentrated to leave 3-bromomethyl-5-chlorothianaphthene as the residue.

To 5.0 g. of sodium in 250 ml. of absolute ethanol is added 38.0 g. of diethyl α-methylmalonate followed by 57.0 g. of 3-bromomethyl-5-chlorothianaphthene. The resulting mixture is stirred and refluxed for 24 hours. The mixture is cooled and diluted with water and ether. The ether layer is separated, washed with water and dried over magnesium sulfate. Filtration and evaporation of the solvent leaves as a yellow oil, crude diethyl α-[5-chloro-3-thianaphthenyl)-methyl]-α-methylmalonate.

A mixture of 72.4 g. of this malonate, 67.5 g. of potassium hydroxide in 75 ml. of water and 750 ml. of dilute ethanol is refluxed for 17 hours. The alcohol is removed in vacuo and the residue dissolved in water. The water solution is washed with ether, filtered and made acidic with concentrated hydrochloric acid. An oil separated which crystallized with cooling to give α-[(5-chloro-3-thianaphthenyl)methyl]-α-methylmalonic acid, M.P. 176–181° C. After recrystallization from aqueous ethanol, the product melted at 204–207° C.

This α-[(5-chloro-3-thianaphthenyl)-methyl]-α-methylmalonic acid is heated for two hours at 200° C. The cooled melt (crude β-(5-chloro-3-thianaphthenyl)-α-methylpropionic acid) is dissolved in 110 ml. of thionyl chloride and allowed to stand at room temperature for 17 hours. The excess thionyl chloride is removed in vacuo and the residue distilled to give β-(5-chloro-3-thianaphthenyl)-α-methylpropionyl chloride as a yellow oil, B.P. 149–152° C. at 0.2 mm.

A solution of 34.1 g. of β-(5-chloro-3-thianaphthenyl)-α-methylpropionyl chloride in 100 ml. of dry toluene is added to 32.5 g. of sodium azide in 120 ml. of dry toluene. The mixture is stirred and refluxed for three hours, then filtered and evaporated in vacuo to leave as the residue, crude β-(5-chloro-3-thianaphthenyl)-α-methylethanol isocyanate.

A mixture of 15.75 g. of β-(5-chloro-3-thianaphthenyl)-α-methylethanol isocyanate and 150 ml. of concentrated hydrochloric acid is refluxed with stirring for six hours. The mixture is cooled and filtered to give 3-(2'-aminopropyl)-5-chloro-thianaphthene hydrochloride which is recrystallized from ethanol-ether to give the hydrochloride melting at 234–236° C.

The hydrochloride is dissolved in water. The aqueous solution is made basic with sodium hydroxide solution and extracted with ether. Removal of the ether in vacuo leaves the free base, 3-(2'-aminopropyl)-5-chloro-thianaphthene, as the crystalline residue.

Example 7

To a mixture of 4.17 g. of lithium aluminum hydride in 250 ml. of dry ether is added a solution of 15.75 g. of β-(5-chloro-3-thianaphthenyl)-α-methylethanol isocyanate in 100 ml. of dry ether. The resulting mixture is stirred and refluxed for six hours.

The mixture is decomposed with 4.2 ml. of water, 4.2 ml. of 10% sodium hydroxide solution and finally 13 ml. of water. The mixture is refluxed for one hour, then filtered. The filtrate is extracted with 10% hydrochloric acid solution. The acid solution is made basic, extracted with ether and the ether solution washed with water and dried over magnesium sulfate. Evaporation of the solvent in vacuo leaves a yellow oily residue, 5-chloro-3-(2'-N-methylaminopropyl)thianaphthene.

The free base (1.0 g.) is dissolved in 100 ml. of ether and treated with an excess of an acetone solution of maleic acid. The mixture is diluted with ether. The crystals which form are isolated by filtration and recrystallized from ethanol-ether to give 5-chloro-3-(2'-N-methylaminopropyl)thianaphthene maleate.

Example 8 p-Methoxythiophenol is condensed with chloroacetone, then cyclized by treatment with phosphorus pentoxide, and brominated to give 5-methoxy-3-bromomethylthianaphthene. This compound is condensed with diethyl α-methylmalonate in the presence of sodium ethoxide. The malonate product is hydrolyzed to the corresponding malonic acid, then decarboxylated to the propionic acid. The propionyl chloride, prepared by treating the propionic acid with thionyl chloride, is reacted with sodium azide and then with hydrochloric acid to give 3-(2'-aminopropyl)-5-methoxythianaphthene hydrochloride.

The hydrochloride is dissolved in water, treated with an excess of sodium hydroxide solution and extracted with ether. Removal of the ether in vacuo yields 3-(2'-aminopropyl)-5-methoxythianaphthene.

Example 9

To a solution of 23.0 g. of sodium in 2 liters of absolute ethanol is added 174 g. of diethyl α-methylmalonate followed by 182 g. of 2-chloromethylthianaphthene. The resulting mixture is stirred and refluxed for 20 hours. Working up the mixture as described in Example 1 yields diethyl α-methyl-α-(2-thianaphthenylmethyl)malonate.

A mixture of 160 g. of diethyl α-methyl-α-(2-thianaphthenylmethyl)malonate, 158 g. of potassium hydroxide, 500 ml. of water and 1500 ml. of aqueous ethanol is refluxed for 20 hours. The alcohol is removed in vacuo; the residue dissolved in water, washed with ether and made acidic with concentrated hydrochloric acid. The white solid material is filtered off, washed with water and dried to give α-methyl-α-(2-thianaphthenylmethyl)malonic acid. This malonic acid is heated at 170° C. for three hours, then treated with 300 ml. of thionyl chloride as described in Example 1. Working up the residue as in Example 1, gives α-methyl-β-(2-thianaphthenyl)propionyl chloride.

A solution of 23.8 g. of this propionyl chloride in 80 ml. of dry toluene is added to 25 g. of sodium azide in 80 ml. of dry toluene. The mixture is refluxed for three hours, filtered and washed with benzene. Concentration of the filtrate gives α-methyl-β-(2-thianaphthenyl)ethanol isocyanate as the residue. This residue is cooled in ice; 150 ml. of concentrated hydrochloric acid is added slowly. The mixture is heated at reflux overnight. Cooling the mixture gives 2-(2'-aminopropyl)thianaphthene hydrochloride as a white precipitate.

The hydrochloride is dissolved in water, treated with an excess of sodium hydroxide solution and extracted with ether. Evaporation of the ether solution gives 2-(2'-aminopropyl)thianaphthene as the residue. A sample (1.0 g.) of this residue is dissolved in 100 ml. of ether and treated with an excess of citric acid in acetone solution. Dilution with ether and cooling yields crystals of 2-(2'-aminopropyl)thianaphthene citrate.

To a mixture of 19.1 g. of 2-(2'-aminopropyl)thianaphthene in 200 ml. of ethanol is added slowly 9.8 g. of cyclohexanone. The resulting mixture is stirred for 3 hours, then diluted with water and extracted with ether. The ether solution is dried over anhydrous magnesium sulfate and the ether is removed by evaporation. The residue is dissolved in 300 ml. of absolute ethanol. Sodium borohydride (3.8 g.) is added slowly. The resulting mixture is refluxed for 15 minutes. The solution is diluted to twice its volume with cold water. The crystalline product, 2-(2'-N-cyclohexylaminopropyl)thianaphthene, is isolated by filtration.

Example 10

To a stirred solution of 19.1 g. of 2-(2'-aminopropyl)thianaphthene, prepared as in Example 9, in 100 ml. of dry benzene is added slowly a solution of 5.4 g. of butyryl chloride in 25 ml. of benzene while cooling in an ice bath. The solution is allowed to come to room temperature and then refluxed for 2 hours. The mixture is filtered and the filtrate washed with dilute hydrochloric acid and water. After drying over anhydrous magnesium sulfate the benzene solution is evaporated in vacuo to leave crude 2-(2'-N-butyrylaminopropyl)thianaphthene as the solid residue.

To a mixture of 3.79 g. of lithium aluminum hydride in 250 ml. of dry ether is added a solution of 13.05 g. of 2-(2'-N-butyrylaminopropyl)thianaphthene in 100 ml. of dry ether. The resulting mixture is stirred and refluxed for 20 hours. The mixture is decomposed with 3.8 ml. of water, 3.8 ml. of 10% sodium hydroxide solution and finally 11 ml. of water. The mixture is filtered and extracted with 10% hydrochloric acid solution. The acid solution is made basic with sodium hydroxide, extracted with ether and the ether solution washed with water and dried over anhydrous magnesium sulfate. Evaporation of the solvent yields 2-(2'-N-butylaminopropyl)thianaphthene as the residue.

The free base (1.0 g.) is dissolved in 10 ml. of acetone. The acetone solution is adjusted to pH 2 with ethereal hydrogen chloride and additional ether is added to complete the precipitation of hydrochloride. The precipitate is isolated by filtration and recrystallized from ethanol-ether to give 2-(2'-N-butylaminopropyl)thianaphthene hydrochloride.

*Example 11*

A solution of 5.4 g. of butyryl chloride in 25 ml. of benzene is added slowly with stirring to a solution of 25.7 g. of 2-(2'-N-butylaminopropyl)thianaphthene, made as in Example 10, in 100 ml. of benzene while cooling in an ice bath. The solution is allowed to come to room temperature, then refluxed for 3 hours. The mixture is worked up as described in Example 10 to give 2-(2'-N-butyl-N-butyrylaminopropyl)thianaphthene.

The amide is reduced with lithium aluminum hydride as outlined in Example 10 to give 2-(2'-N,N-dibutylaminopropyl)thianaphthene.

The free base (1.0 g.) in 100 ml. of ethanol is acidified with ethereal hydrogen chloride and ether is added to complete the precipitation. The precipitate is isolated by filtration and recrystallized from ethanol-ether to give 2-(2'-N,N - dibutylaminopropyl)thianaphthene hydrochloride.

*Example 12*

A mixture of p-bromothiophenol (189 g.) in an aqueous solution containing 40 g. of sodium hydroxide is treated with 93 g. of chloroacetone, keeping the temperature at 20–25° C. for 30 minutes. Working up the mixture as described in Example 6 yields 1-(4'-bromophenylmercapto)-2-propanone.

Treatment of the propanone (24.5 g.) with 25.0 g. of phosphorus pentoxide as outlined in Example 6 results in 5-bromo-3-methylthianaphthene.

A mixture of 22.7 g. of 5-bromo-3-methylthianaphthene, 17.8 g. of N-bromosuccinimide and 250 ml. of carbon tetrachloride is refluxed for two hours. The succinimide is removed by filtration. The filtrate is concentrated to give 5-bromo-3-bromomethylthianaphthene as the residue.

Diethyl α-methylmalonate (17.4 g.) is added to 2.3 g. of sodium in 250 ml. of absolute ethanol, followed by 30.6 g. of 5-bromo-3-bromomethylthianaphthene. The resulting mixture is refluxed for 20 hours, cooled and diluted with water and ether. The ether layer is washed with water, dried over magnesium sulfate and filtered. Evaporation of the ether leaves crude diethyl α-[(5-bromo-3-thianaphthenyl)-methyl]-α-methylmalonate. This malonate is refluxed with 30.0 g. of potassium hydroxide in aqueous ethanol for 15 hours and worked up as described in Example 6 to give α-[(5-bromo-3-thianaphthenyl)-methyl]-α-methyl malonic acid. This malonic acid is heated for two hours at 200° C., cooled and treated with 60 ml. of thionyl chloride. The mixture is allowed to stand at room temperature for 20 hours. Removal of the excess thionyl chloride and distillation of the residue gives α - (5-bromo-3-thianaphthenyl)-α-methylpropionyl chloride.

Treatment of this propionyl chloride with sodium azide and subsequent treatment with hydrobromic acid, as described in Example 6, yields 3-(2'-aminopropyl)-5-bromothianaphthene hydrobromide.

A mixture of 27.1 g. of 3-(2'-aminopropyl)-5-bromothianaphthene (prepared by treating the hydrobromide with aqueous sodium hydroxide, extraction with ether and evaporation of the ether), 35 g. of 1,4-dibromobutane and 20 ml. of dry pyridine is heated at 95° C. for 16 hours. The mixture is cooled and diluted with water and ether. The ether layer is washed with water, dried over magnesium sulfate and evaporated to give the crude 3-[2'-(1''-pyrrolidyl)propyl]thianaphthene.

*Example 13* p-Nitrothiophenol is condensed with chloroacetone to form 1-(4'-nitrophenylmercapto)-2-propanone which is cyclized by treatment with phosphorus pentoxide. The resulting 5-nitro-3-methylthianaphthene is brominated with N-bromosuccinimide to give 5-nitro-3-bromomethylthianaphthene.

Diethyl α-ethylmalonate is condensed with 5-nitro-3-bromomethylthianaphthene in the presence of sodium ethoxide as described in Example 12. The resulting ester is hydrolyzed to the malonic acid which is then decarboxylated to the propionic acid. Treatment with thionyl chloride yields the propionyl chloride which is reacted with sodium azide to give α-ethyl-β-(5-nitro-3-thianaphthenyl)ethanol isocyanate.

The isocyanate (15.0 g.) is refluxed with 150 ml. of concentrated hydrochloric acid for five hours. The mixture is cooled and filtered to give 3-(2'-aminobutyl)-5-nitrothianaphthene hydrochloride.

Cyclopentanone (8.4 g.) is added slowly to a solution of 25.0 g. of 3-(2'-aminobutyl)-5-nitrothianaphthene (prepared by treating the hydrochloride with aqueous sodium hydroxide, extracting with ether and evaporating the ether) and the resulting mixture is stirred for 4 hours, then diluted with water and extracted with ether. The ethereal solution is dried over magnesium sulfate and evaporated. The residue is taken up in 350 ml. of absolute ethanol. Sodium borohydride (3.8 g.) is added slowly and the resulting mixture is heated at reflux for 15 minutes. A dilute aqueous solution containing 8.0 g. of sodium hydroxide is added followed by 350 ml. of cold water. The crystalline product, 3-(2'-N-cyclopentylaminobutyl)-5-nitrothianaphthene is isolated by filtration.

*Example 14* m-Methylthiophenol is condensed with chloroacetone to give 1-(3'-methylphenylmercapto)-2-propanone. Cyclization by treatment with phosphorus pentoxide and bromination using N-bromosuccinimide yields 6-methyl-3-bromomethylthianaphthene.

Diethyl α-methylmalonate (17.4 g.) is added to 2.3 g. of sodium in 200 ml. of absolute ethanol, followed by 24.1 g. of 6-methyl-3-bromomethylthianaphthene. The resulting mixture is refluxed for 24 hours, cooled and diluted with water and ether. The ether layer is washed with water, dried and filtered. Evaporation of the ether leaves diethyl α-[(6-methyl-3-thianaphthenyl)-methyl]-α-methylmalonate. This ester is hydrolyzed to the malonic acid, then decarboxylated to the corresponding propionic acid. Treatment with thionyl chloride yields the propionyl chloride which is reacted with sodium azide to give α-methyl-β-(6-methyl-3-thianaphthenyl)-ethanol isocyanate. The isocyanate is refluxed with 100 ml. of concentrated hydrochloric acid for five hours. The mixture is cooled and filtered to give crystals of 3-(2'-aminopropyl)-6-methylthianaphthene hydrochloride.

A mixture of 20.6 g. of 3-(2'-aminopropyl)-6-methylthianaphthene, prepared from the hydrochloride salt by treatment with aqueous sodium hydroxide and extraction with ether, and 100 ml. of acetic anhydride is heated at 100° C. for 2 hours. Excess acetic anhydride is decomposed with water and the product extracted with ether. The ether solution is washed with water, diluted hydrochloric acid and aqueous sodium bicarbonate solution. After drying over anhydrous magnesium sulfate, the ether solution is concentrated to give a crystalline residue of 3-(2'-N-acetylaminopropyl)-6-methylthianaphthene.

The above amide (12.4 g.) in 100 ml. of dry ether is added slowly to a stirred suspension of 3.79 g. of lithium aluminum hydride in 250 ml. of dry ether. The resulting mixture is stirred and refluxed for 24 hours. Excess lithium aluminum hydride is decomposed with 3.8 ml. of water, 3.8 ml. of 10% sodium hydroxide solution and finally 11 ml. of water. The mixture is filtered and the filtrate extracted with 10% hydrochloric acid. The acid solution is made basic with dilute sodium hydroxide and extracted with ether. The ether solution is dried over anhydrous sodium sulfate and concentrated to give 3-(2'-N-ethylaminopropyl)-6-methylthianaphthene as the residue. Treatment of this residue with acetic anhydride followed by reduction with lithium aluminum hydride as described above gives 3-(2'-N,N-diethylaminopropyl)-6-methylthianaphthene.

Example 15

A sample of 19.2 g. of 3-(2'-aminopropyl)-5-methoxy-thianaphthene, prepared as in Example 8, is refluxed with 100 ml. of 48% hydrobromic acid for 6 hours in an atmosphere of nitrogen. Excess hydrobromic acid is removed in vacuo and the residue is recrystallized from ethanol-ether to give 3-(2'-aminopropyl)-5-hydroxythianaphthene hydrobromide.

Example 16 p-Ethylthiophenol is condensed with chloroacetone to form 1-(4'-ethylphenylmercapto)-2-propanone which is cyclized by treatment with phosphorus pentoxide. The resulting 5-ethyl-3-methylthianaphthene is brominated with N-bromosuccinimide to give 5-ethyl-3-bromomethylthianaphthene.

Diethyl α-butylmalonate is condensed with 5-ethyl-3-bromomethylthianaphthene in the presence of sodium ethoxide as described in Example 12. The resulting ester is hydrolyzed to the malonic acid which is then decarboxylated to give α-butyl-β-(5-ethyl-3-thianaphthenyl) propionic acid. Treatment with thionyl chloride yields the propionyl chloride which is reacted with sodium azide to give α-butyl-β-(5-ethyl-3-thianaphthenyl)ethanol isocyanate.

The isocyanate is refluxed with concentrated hydrochloric acid, cooled and filtered to give 3-(2'-aminohexyl)-5-ethylthianaphthene hydrochloride.

A solution of the free base (1.0 g) in 100 ml. of ether is treated with excess tartaric acid. Concentration and cooling yields the tartrate salt.

Example 17 p-Trifluoromethylaniline (120.0 g.) is added slowly to a mixture of 150 ml. of concentrated hydrochloric acid and 150 g. of crushed ice. A cold solution of sodium nitrite (49.2 g.) in 125 ml. of water is added slowly keeping the temperature below 4° C. The resulting solution is added slowly to 140 g. of potassium ethyl xanthate in 180 ml. of water at 40–45° C. The oily p-trifluoromethylphenyl ethyl xanthate which separates is washed first with 10% sodium hydroxide solution and then with water. The xanthate is dissolved in 95% ethanol. The solution is refluxed with 160 g. of potassium hydroxide for eight hours. The alcohol is removed by distillation. Water is added to the residue and the aqueous mixture is washed with ether. The aqueous mixture is made strongly acid with concentrated sulfuric acid and is then steam distilled. The lower layer is separated and redistilled to obtain p-trifluoromethylthiophenol.

Condensation of p-trifluoromethylthiophenol with chloroacetone and subsequent cyclization by treatment with phosphorus pentoxide gives 5-trifluoromethyl-3-methylthianaphthene which is then brominated with N-bromosuccinimide to give 5-trifluoromethyl-3-bromomethylthianaphthene.

In the manner described in Example 12, diethyl α-methylmalonate is condensed with 5-trifluoromethyl-3-bromomethylthianaphthene in the presence of sodium ethoxide. The resulting ester is hydrolyzed and decarboxylated to the propionic acid which is treated with thionyl chloride to obtain the corresponding propionyl chloride. Reaction of the propionyl chloride with sodium azide gives α-methyl-β-(5-trifluoromethyl-3-thianaphthyl) ethanol isocyanate. Refluxing the isocyanate with concentrated hydrochloric acid, cooling and filtering gives 3-(2'-aminopropyl)-5-trifluoromethylthianaphthene hydrochloride.

Example 18

A mixture of 15.0 g. of 3-(2'-aminopropyl)-5-trifluoromethylthianaphthene (prepared as in Example 17) and 75 ml. of acetic anhydride is allowed to stand for 16 hours at room temperature. The excess acetic anhydride is removed in vacuo. The residue is diluted with water and warmed for one hour on a steam bath. Cooling and filtration yields crystals of 3-(2'-N-acetylaminopropyl)-5-trifluoromethylthianaphthene.

To a solution of 12.0 g. of the N-acetyl compound in 250 ml. of glacial acetic acid is added 35 ml. of 30% hydrogen peroxide solution. The resulting mixture is heated at 50° C. for 20 minutes, then refluxed for one hour. The solution is poured into water, allowed to stand overnight and filtered to give crystals of 3-(2'-N-acetylaminopropyl)-5-trifluoromethylthianaphthene-1,1-dioxide.

This dioxide is refluxed in 10% sulfuric acid solution. The resulting solution is cooled, filtered, washed with ether and made basic with sodium hydroxide solution. Extraction with ether and subsequent evaporation of the solvent gives 3-(2'-aminopropyl)-5-trifluoromethylthianaphthene-1,1-dioxide.

Treatment of the free base with excess maleic acid in acetone solution and dilution with ether yields the maleate salt of 3-(2'-aminopropyl)-5-trifluoromethylthianaphthene-1,1-dioxide.

Example 19 m-Butoxyaniline is diazotized, then reacted with potassium ethyl xanthate to obtain m-butoxyphenyl ethyl xanthate as outlined in Example 17. The xanthate is hydrolyzed to give m-butoxythiophenol.

Condensation of m-butoxythiophenol with chloroacetone and subsequent cyclization by treatment with phosphorus pentoxide yields 6-butoxy-3-methylthianaphthene which is brominated with an equivalent amount of N-bromo-succinimide to give 6-butoxy-3-bromomethylthianaphthene.

Condensation of diethyl α-methylmalonate with 6-butoxy-3-bromomethylthianaphthene in the presence of sodium ethoxide as described in Example 12, followed by hydrolysis and decarboxylation of the resulting ester gives β-(6-butoxy-3-thianaphthenyl)-α-methylpropionic acid. Treatment of the propionic acid with thionyl chloride yields the corresponding propionyl chloride which upon reaction with sodium azide, refluxing with hydrochloric acid, cooling and filtering gives 3-(2'aminopropyl)-6-butoxythianaphthene hydrochloride.

Example 20 p-Butylaniline is diazotized, reacted with potassium ethyl xanthate as in Example 17 to obtain p-butylthiophenol.

Condensation of p-butylthiophenol with chloroacetone and subsequent cyclization by treatment with phosphorus pentoxide yields 5-butyl-3-methylthianaphthene which is then brominated with an equivalent amount of N-bromosuccinimide to give 5-butyl-3-bromomethylthianaphthene.

Diethyl α-methylmalonate is condensed with 5-butyl-3-bromomethylthianaphthene in the presence of sodium ethoxide as outlined in Example 12. The resulting ester is hydrolyzed and decarboxylated to give the corresponding propionic acid. Treatment with thionyl chloride yields β-(5-butyl-3-thianaphthenyl)-α-methylpropionyl chloride. Reaction of the propionyl chloride with sodium azide, refluxing with hydrochloric acid, cooling and filtering gives 3-(2'-aminopropyl)-5-butylthianaphthene hydrochloride.

Example 21

To a suspension of 72.2 g. of lithium in dry ether is added 600 g. of n-butyl bromide in ether while cooling in an acetone-Dry Ice bath. The resulting mixture is placed under nitrogen and stirred for 2 hours, then 292 g. of 5-methylthianaphthene in dry ether is added slowly. The mixture is stirred and refluxed for one hour, then cooled to 0° C. and formaldehyde (generated by heating 190 g. of dry paraformaldehyde at 190° C.) is introduced over a period of 4 hours. Excess lithium is removed, the mixture decomposed by gradual addition of ethanol and water, and made acidic with hydrochloric acid. The ether layer is separated, washed with water and dried over anhydrous magnesium sulfate. The solvent is removed in vacuo to give crude 2-hydroxymethyl-5-methylthianaphthene, which is recrystallized from n-heptane.

This compound is added slowly to 460 g. of thionyl chloride and the mixture refluxed for 2 hours. Excess thionyl chloride is removed in vacuo and the residue is stripped with benzene. The residue is recrystallized from ligroin to yield 2-chloromethyl-methylthianaphthene.

Diethyl α-methylmalonate is condensed with 2-chloromethyl-5-methylthianaphthene as described in Example 12. The resulting ester is hydrolyzed and decarboxylated to yield the propionic acid which is treated with thionyl chloride to obtain the corresponding propionyl chloride. Treatment of the propionyl chloride with sodium azide gives α-methyl-β-(5-methyl-2-thianaphthenyl) ethanol isocyanate. Refluxing the isocyanate with concentrated hydrochloric acid, cooling and filtering gives 2 - (2'-aminopropyl)-5-methylthianaphthene hydrochloride.

*Example 22*

To 6.25 g. of sodium in 180 ml. of absolute ethanol is added 49.3 g. of diethyl α-methylmalonate, followed by 45.2 g. of 2-chloromethylbenzofuran. The resulting mixture is stirred and refluxed for 24 hours.

Cooling, diluting the mixture with water and ether, separating the ether layer, evaporating the ether and distilling the residue yields diethyl α-(2-benzofuranylmethyl)-α-methylmalonate.

A solution of 46.5 g. of potassium hydroxide, 50.97 g. of diethyl α-(2-benzofuranylmethyl)-α-methylmalonate, 94 ml. of water and 500 ml. of ethanol is refluxed for 24 hours. Concentration of the reaction mixture, dilution with water, washing with ether and acidification of the aqueous solution with concentrated hydrochloric acid gives α-(2-benzofuranylmethyl)-α-methylmalonic acid as colorless crystals, M.P. 181–3° C. (decomp.).

A 37.6 g. sample of α-(2-benzofuranylmethyl)-α-methylmalonic acid is heated for two hours at 200° C., then cooled and treated with 80 ml. of thionyl chloride at room temperature for 36 hours. The excess thionyl chloride is removed in vacuo and two portions of benzene are added and removed in vacuo. The residue is distilled to give β-(2-benzofuranyl)-α-methylpropionyl chloride as a yellow oil, B.P. 101–5° C. at 0.2 mm.

To 39.6 g. of sodium azide in 150 ml. of dry toluene is added slowly a solution of 29.23 g. of β-(2-benzofuranyl)-α-methylpropionyl chloride in 120 ml. of dry toluene and the resulting mixture is refluxed for three hours. Filtration and evaporation of the filtrate leaves β-(2-benzofuranyl)-α-methylethanol isocyanate as a yellow oil.

A mixture of 15.0 g. of this isocyanate and 150 ml. of concentrated hydrochloric acid is refluxed for four hours. The solution is concentrated and the residue is dissolved in water, washed with ether and made basic with 40% sodium hydroxide. The basic solution is extracted with ether and the ether solution is washed with water and evaporated to give, as the residue, 2-(2'-aminopropyl)-benzofuran.

The base is dissolved in ether, acidified with ethereal hydrogen chloride and filtered to give 2-(2'-aminopropyl)-benzofuran hydrochloride, M.P. 165–167° C.

*Example 23*

To 3.8 g. of lithium aluminum hydride in 250 ml. of dry ether is added a solution of 11.5 g. of β-(2-benzofuranyl)-α-methylethanol isocyanate, made as in Example 22, in 200 ml. of dry ether. The resulting mixture is refluxed for eight hours, then treated with 3.8 ml. of water, 3.8 ml. of 10% sodium hydroxide solution and 11.4 ml. of water and refluxed for 30 minutes.

The mixture is filtered. The filtrate is washed with water, extracted with 10% hydrochloric acid and the acid solution is made basic with 40% sodium hydroxide. The basic solution is extracted with ether and the ether extract is washed with water and evaporated. The residue is dissolved in ethanol, acidified with ethereal hydrogen chloride and diluted with ether. The precipitate is collected and recrystallized from ethanol-ether to give colorless crystals of 2-(2'-N-methylaminopropyl)benzofuran hydrochloride, M.P. 137–139° C.

*Example 24*

To 21.4 g. of sodium in 650 ml. of absolute ethanol is added 162 g. of diethyl α-methylmalonate followed by 269.0 g. of 2-bromo-3-bromomethylbenzofuran (which is prepared by refluxing 3-methylbenzofuran with an excess of N-bromosuccinimide in carbon tetrachloride solution with benzoyl peroxide). The resulting mixture is refluxed for 24 hours and worked up as in Example 22 to give diethyl α-[3-(2-bromo)benzofuranylmethyl]-α-methylmalonate.

A solution of 34.0 g. of this malonate and 32.0 g. of potassium hydroxide in 50 ml. of water and 200 ml. of ethanol is refluxed for 16 hours. Concentration, dilution with water and acidification with concentrated hydrochloric acid gives α-[3-(2-bromo)benzofuranylmethyl]-α-methylmalonic acid as a colorless solid, M.P. 158–161° C.

This malonic acid is heated at 200–220° C. for three hours. The cooled melt is dissolved in 10% sodium hydroxide and the solution is washed with ether and acidified with concentrated hydrochloric acid. The oil which separates is extracted into methylene chloride. The methylene chloride solution is concentrated and filtered to give, as a tan solid, β-(2-bromo-3-benzofuranyl)-α-methylpropionic acid, M.P. 91–93° C.

A mixture of 28.3 g. of this propionic acid, 100 ml. of 10% sodium hydroxide solution and 1 tsp. of Raney nickel is hydrogenated at room temperature for six hours at about 50 p.s.i. The catalyst is filtered and the filtrate is washed with ether, acidified with concentrated hydrochloric acid and extracted with methylene chloride. The extract is washed with water and evaporated in vacuo to give as the residue β-(3-benzofuranyl)-α-methylpropionic acid as an orange oil.

A solution of 24.0 g. of β-(3-benzofuranyl)-α-methylpropionic acid in 45 ml. of thionyl chloride is allowed to stand overnight at room temperature. The mixture is concentrated in vacuo and two portions of benzene are added and removed in vacuo. Distillation of the residue gives β-(3-benzofuranyl)-α-methylpropionyl chloride, B.P. 135–140° C. at 1.0 mm.

A solution of 14.05 g. of this propionyl chloride in 80 ml. of toluene is added to 18.0 g. of sodium azide in 60 ml. of toluene and the mixture is refluxed for 24 hours. Filtration, concentration and distillation of the residue gives β-(3-benzofuranyl)-α-methylethanol isocyanate as an oil, B.P. 125–128° C. at 0.2 mm.

A mixture of 31.13 g. of this isocyanate in 450 ml. of concentrated hydrochloric acid is refluxed overnight, then cooled and diluted with water and ether. The aqueous layer is made basic with 40% sodium hydroxide and extracted with ether. Evaporation of the ether extracts leaves 3-(2'-aminopropyl)benzofuran.

The base is dissolved in alcohol, treated with excess ethereal hydrogen chloride and diluted with ether. Filtration gives 3-(2'-aminopropyl)benzofuran hydrochloride, which is recrystallized from ethanol-ether to give colorless crystals, M.P. 187–189° C.

*Example 25*

A mixture of 16.2 g. of 5-methoxy-3-methylbenzofuran, 39.0 g. of N-bromosuccinimide, 250 mg. of benzoyl peroxide and 200 ml. of carbon tetrachloride is refluxed for two hours. Filtration and concentration of the filtrate gives 2-bromo-3-bromomethyl-5-methoxybenzofuran as the residue.

Diethyl α-methylmalonate is condensed with 2-bromo-3-bromomethyl-5-methoxybenzofuran in the presence of sodium ethoxide as described in Example 24. The resulting ester is hydrolyzed to the malonic acid which is then decarboxylated to the propionic acid.

A mixture of 24.0 g. of β-(2-bromo-5-methoxy-3-benzofuranyl)-α-methylpropionic acid, 90 ml. of 10% sodium hydroxide and 1 tsp. of Raney nickel is hydrogenated at 25° C. for six hours at 50 p.s.i. Working up the reaction mixture as in Example 24 gives β-(5-methoxy-3-benzofuranyl)-α-methylpropionic acid.

A solution of 18.0 g. of the above prepared propionic acid in 40 ml. of thionyl chloride is allowed to stand overnight at room temperature. The mixture is concentrated and the residue taken up in benzene. The benzene solution is concentrated giving crude β-(5-methoxy-3-benzofuranyl)-α-methylpropionyl chloride.

A toluene solution of this propionyl chloride is refluxed with 20.0 g. of sodium azide for 24 hours. Filtration, concentration and distillation of the residue gives β-(5-methoxy-3-benzofuranyl)-α-methylethanol isocyanate.

A mixture of this isocyanate (15.0 g.) is refluxed in 250 ml. of concentrated hydrochloric acid for 16 hours. Working up as in Example 24 gives 3-(2'-aminopropyl)-5-methoxybenzofuran.

Treatment of the free base in acetone solution with excess maleic acid and dilution with ether yields the maleate salt of 3-(2'-aminopropyl)-5-methoxybenzofuran.

*Example 26*

6-chlorocoumarilic acid (9.8 g.) is added slowly to 4.0 g. of lithium aluminum hydride in 200 ml. of dry ether and the resulting mixture is refluxed for five hours. The mixture is treated with 4.0 ml. of water, 4.0 ml. of 10% sulfuric acid and 10 ml. of water and refluxed for 30 minutes. Filtration and concentration of the filtrate gives as the residue, crude 6-chloro-2-hydroxymethylbenzofuran.

The above prepared hydroxymethyl compound is refluxed for one hour with 50 ml. of thionyl chloride in 50 ml. of toluene. The solvents are removed in vacuo and the residue taken up in benzene. The benzene solution is concentrated and distilled to give 6-chloro-2-chloromethylbenzofuran.

To 2.5 g. of sodium in 125 ml. of absolute ethanol is added 19.0 g. of diethyl α-methylmalonate followed by 22.0 g. of 6-chloro-2-chloromethylbenzofuran. The resulting mixture is refluxed for 24 hours and worked up as in Example 22 to give diethyl α-(6-chloro-2-benzofuranylmethyl)-α-methylmalonate. Hydrolysis of this ester with potassium hydroxide and decarboxylation and treatment with thionyl chloride gives β-(6-chloro-2-benzofuranyl)-α-methylpropionyl chloride.

This propionyl chloride is refluxed with sodium azide in dry toluene solution and worked up as in Example 24 to give β-(6-chloro-2-benzofuranyl)-α-methylethanol isocyanate.

The isocyanate is refluxed with concentrated hydrochloric acid, then cooled and diluted with water and ether. The aqueous layer is treated with excess 40% sodium hydroxide and extracted with ether. Concentration of the ether extract leaves, as the residue 2-(2'-aminopropyl)-6-chlorobenzofuran.

*Example 27*

Diethyl α-butylmalonate is condensed with 2-chloromethylbenzofuran in the presence of sodium ethoxide as described in Example 22. Hydrolysis of the resulting ester to the malonic acid and decarboxylation of the malonic acid gives β-(2-benzofuranyl)-α-butylpropionic acid. Treatment with thionyl chloride yields the propionyl chloride which is reacted with sodium azide to give β-(2-benzofuranyl)-α-butylethanol isocyanate.

The isocyanate is refluxed with concentrated hydrochloric acid and worked up as in Example 22 to give 2-(2'-aminohexyl)benzofuran.

*Example 28*

Diethyl α-ethylmalonate (18.8 g.) is added to 2.3 g. of sodium in 100 ml. of absolute ethanol. 2-chloromethylbenzofuran (16.6 g.) is added and the resulting mixture is refluxed for 24 hours. Working up the mixture as in Example 22 gives diethyl α-(2-benzofuranylmethyl)-α-methylmalonate.

Hydrolysis of this ester with potassium hydroxide and decarboxylation of the malonic acid gives β-(2-benzofuranyl)-α-ethylpropionic acid.

A solution of 20.0 g. of this propionic acid in 50 ml. of thionyl chloride is allowed to stand at room temperature for 16 hours. The excess thionyl chloride is removed in vacuo. The residue is dissolved in benzene, evaporated and distilled to give β-(2-benzofuranyl)-α-ethylpropionyl chloride.

To 20.0 g. of sodium azide in 60 ml. of dry toluene is added, with stirring and warming, a solution of 15.0 g. of the above prepared propionyl chloride in 100 ml. of dry toluene. The resulting mixture is refluxed for 24 hours and filtered. The filtrate is evaporated to give β-(2-benzofuranyl)-α-ethylethanol isocyanate.

This isocyanate is refluxed with 100 ml. of concentrated hydrochloric acid for five hours. Working up as in Example 24 gives 2-(2'-aminobutyl)benzofuran.

The free base is dissolved in alcohol and treated with an excess of ethereal hydrogen chloride. Dilution with ether and filtration gives 2-(2'-aminobutyl)benzofuran hydrochloride.

*Example 29*

A solution of 12.0 g. of ethyl chloroformate in 75 ml. of dry benzene is added to a solution of 16.5 g. of 2-(2'-N-methylaminopropyl)benzofuran (made as in Example 23) and 20.0 g. of pyridine in 150 ml. of dry benzene. The resulting mixture is allowed to stand overnight and is worked up as in Example 5 to give 2-(2'-N-methylaminopropyl)benzofuran urethan.

An ether solution of this urethan is added slowly to 7.0 g. of lithium aluminum hydride in 100 ml. of dry ether. The resulting mixture is refluxed for eight hours, then treated with 7.0 ml. of water, 7.0 ml. of 10% sodium hydroxide solution and 15 ml. of water. Refluxing for one hour, filtering, extracting with 10% hydrochloric acid, making the acid solution basic with 40% sodium hydroxide, extracting with ether and concentrating the ether extract gives 2-(2'-N,N-dimethylaminopropyl)benzofuran as the residue.

A solution of the free base (1.0 g.) in 50 ml. of ether is treated with excess tartaric acid. Filtration gives the tartrate salt.

*Example 30*

A mixture of 15.0 g. of 3-(2'-aminopropyl)benzofuran, prepared as in Example 24, 25.0 ml. of dry pyridine and 25.0 g. of 1,5-dibromopentane is heated on a steam bath for 20 hours. Working up the reaction mixture as in Example 3 gives 3-[2'-(1''-piperidyl)propyl]benzofuran.

This application is a continuation-in-part of application Serial No. 747,816 filed July 11, 1958, now abandoned.

It is not desired to be limited except as set forth in the following claims.

What is claimed is:

1. A chemical compound of the class consisting of a free base and its non toxic acid addition salts, the free base having the following formula:

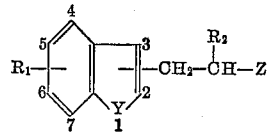

in which Y is a member selected from the group consisting of S, O and $SO_2$; $R_1$ is a member selected from the group consisting of hydrogen, hydroxy, chloro, bromo, nitro, trifluoromethyl, lower alkyl and lower alkoxy, said member being substituted in a position $\beta$ to the hetero ring; $R_2$ is lower alkyl and Z is a member selected from the group consisting of amino, mono-lower-alkylamino, di-lower-alkylamino, cyclopentylamino, cyclohexylamino, N-piperidino and N-pyrrolidino.

2. A chemical compound having the following fundamental structural formula:

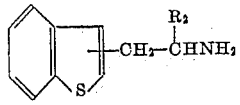

in which $R_2$ is lower alkyl.

3. A chemical compound having the following fundamental structural formula:

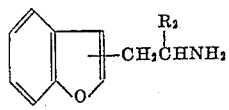

in which $R_2$ is lower alkyl.

4. 3-(2'-aminopropyl)thianaphthene.
5. 3-(2'-aminopropyl)thianaphthene hydrochloride.
6. 2-(2'-aminopropyl)benzofuran.
7. 2-(2'-aminopropyl)benzofuran hydrochloride.
8. 2-(2'-aminopropyl)thianaphthene.
9. 3-(2'-aminopropyl)benzofuran.

References Cited in the file of this patent

UNITED STATES PATENTS 2,507,473  Koelsch _____ May 9, 1950

OTHER REFERENCES

Snyder et al.: Journal of the American Chemical Society, vol. 69, p. 3140 (1947).

Cagniant: Bull. Soc. Chim. (France), p. 382 (1949).

Hartough et al.: Compounds with Condensed Thiophene Rings, 1954, Interscience Publishers Inc., New York, N.Y. (page 62).